(12) United States Patent
Prakash (10) Patent No.: US 7,830,552 B2
(45) Date of Patent: *Nov. 9, 2010

(54) BLACK WHITE IMAGE SCALING HAVING PRINT DENSITY CONTROL AND POLARITY DETECTION

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 819 days.

This patent is subject to a terminal disclaimer.

(21) Appl. No.: 11/107,217

(22) Filed: Apr. 15, 2005

(65) Prior Publication Data

US 2006/0232794 A1    Oct. 19, 2006

(51) Int. Cl.
*H04N 1/40* (2006.01)
*H04N 1/403* (2006.01)
*G06K 15/00* (2006.01)

(52) U.S. Cl. ............... 358/2.99; 358/1.2; 358/1.9; 358/3.1; 382/162; 382/166; 382/232; 382/233; 382/298; 382/299; 345/698

(58) Field of Classification Search ............ 358/2.99, 358/1.2; 382/232, 233
See application file for complete search history.

(56) References Cited

U.S. PATENT DOCUMENTS

| | | | |
|---|---|---|---|
| 3,976,982 A | 8/1976 | Eiselen | |
| 4,536,792 A * | 8/1985 | Harshbarger | 348/189 |
| 4,546,385 A * | 10/1985 | Anastassiou | 348/390.1 |
| 4,725,885 A * | 2/1988 | Gonzales et al. | 375/240.14 |
| 4,760,463 A * | 7/1988 | Nonoyama et al. | 358/452 |
| 4,811,239 A | 3/1989 | Tsao | |
| 4,924,522 A * | 5/1990 | Bray et al. | 382/237 |
| 5,029,107 A | 7/1991 | Lee | |
| 5,068,905 A | 11/1991 | Hackett et al. | |
| 5,109,438 A | 4/1992 | Alves et al. | |
| 5,282,057 A | 1/1994 | Mailloux et al. | |

(Continued)

FOREIGN PATENT DOCUMENTS

EP    295088 A2 *  12/1988

(Continued)

OTHER PUBLICATIONS

A. Savakis, Evaluation of Lossless Compression Methods for Gray Scale Document and Images, 2000, IEEE, pp. 136-139.*

(Continued)

*Primary Examiner*—Edward L Coles
*Assistant Examiner*—Miya J Cato
(74) *Attorney, Agent, or Firm*—Douglas Lashmit; Hoffman Warnick LLC (57) ABSTRACT

A scaling system and method for scaling a bitonal image that has print density control. A system for scaling a bitonal image is provide that includes: a polarity detection system for detecting a polarity of the bitonal image; a pixel reduction system that generates a scaled image by reducing pixel pairs down to single scaled pixels by selectively applying either a normal or reverse set of pixel reduction rules, wherein an applied set of pixel reduction rules is determined based on a detected polarity; and a line density control system that allows the scaled image to be made lighter or darker by changing the applied set of pixel reduction rules.

27 Claims, 5 Drawing Sheets

U.S. PATENT DOCUMENTS

| | | | | |
|---|---|---|---|---|
| 5,293,254 | A * | 3/1994 | Eschbach | 358/445 |
| 5,404,411 | A | 4/1995 | Banton et al. | |
| 5,414,469 | A | 5/1995 | Gonzales et al. | |
| 5,504,588 | A | 4/1996 | Takeuchi et al. | |
| 5,528,740 | A * | 6/1996 | Hill et al. | 345/428 |
| 5,602,653 | A * | 2/1997 | Curry | 358/3.26 |
| 5,700,611 | A * | 12/1997 | Regan et al. | 430/45.31 |
| 5,717,839 | A | 2/1998 | Ichikawa | |
| 5,757,982 | A | 5/1998 | Tepmongkol | |
| 5,774,751 | A * | 6/1998 | Masuda et al. | 396/297 |
| 5,867,632 | A | 2/1999 | Andree et al. | |
| 5,875,044 | A | 2/1999 | Seto et al. | |
| 5,949,919 | A | 9/1999 | Chen | |
| 5,974,200 | A * | 10/1999 | Zhou et al. | 382/298 |
| 5,982,937 | A | 11/1999 | Accad | |
| 6,088,489 | A * | 7/2000 | Miyake | 382/299 |
| 6,185,328 | B1 | 2/2001 | Shiau | |
| 6,384,895 | B1 | 5/2002 | Sawano | |
| 6,404,919 | B1 * | 6/2002 | Nishigaki et al. | 382/176 |
| 6,493,041 | B1 | 12/2002 | Hanko et al. | |
| 6,606,418 | B2 * | 8/2003 | Mitchell et al. | 382/251 |
| 6,608,915 | B2 | 8/2003 | Tsujii | |
| 6,704,123 | B1 * | 3/2004 | Av-Shalom et al. | 358/2.99 |
| 7,082,220 | B2 * | 7/2006 | Kondo et al. | 382/238 |
| 7,197,157 | B2 * | 3/2007 | Akashi | 382/100 |
| 7,224,486 | B2 * | 5/2007 | Shimizu | 358/2.99 |
| 7,319,775 | B2 * | 1/2008 | Sharma et al. | 382/100 |
| 7,515,758 | B2 * | 4/2009 | Prakash | 382/232 |
| 2002/0005857 | A1 | 1/2002 | Kasahara et al. | |
| 2005/0018873 | A1 * | 1/2005 | Rhoads | 382/100 |
| 2005/0018917 | A1 | 1/2005 | Brothers | |
| 2005/0069217 | A1 * | 3/2005 | Mukherjee | 382/266 |
| 2005/0135700 | A1 | 6/2005 | Anderson | |
| 2005/0169539 | A1 * | 8/2005 | Prakash | 382/232 |
| 2007/0271182 | A1 | 11/2007 | Prakash et al. | |
| 2009/0067754 | A1 * | 3/2009 | Prakash | 382/299 |

FOREIGN PATENT DOCUMENTS

| | | | |
|---|---|---|---|
| EP | 320755 | A2 * | 6/1989 |
| EP | 0539833 | A2 | 5/1993 |
| EP | 710034 | A2 * | 5/1996 |
| JP | 63090962 | | 4/1988 |
| JP | 01147960 | A | 6/1989 |
| JP | 06078136 | | 3/1994 |
| JP | 10108007 | | 4/1998 |
| JP | 11179983 | A | 12/1998 |
| JP | 2002156662 | A | 5/2002 |
| JP | 2002174831 | A | 6/2002 |
| JP | 2002354233 | | 12/2002 |
| JP | 2003241299 | A | 8/2003 |
| WO | WO 9605692 | A1 * | 2/1996 |

OTHER PUBLICATIONS

C. Payson, C. Cianciolo, R. Crouse, C. Winsor, Hardware Accelerators for Bitonal Image Processing, Fall 1991, Digital Technical Journal, vol. 3 No. 4, pp. 1-39.*

Mei Kobayashi et al., "Information Retrieval on the Web", IBM Research, ACM Computing Surveys, vol. 32, No. 2, Jun. 2000, pp. 144-173.

Miller, R.C., Jr., "Introduction to the IBM 3800 Printing Subsystem Models 3 and 8", IBM Journal of Research and Development, vol. 38, No. 3, May 1984, pp. 252-256, (Abstract Only).

Fernando et al, "A Unified Approach to Scene Change Detection in Uncompressed and Compressed Video", IEEE, Copyright 2000, pp. 350-351.

Goertzel et al., United States Defensive Publication No. T985,005, Dated Aug. 7, 1979, "Two-Dimensional Image Data Compression and Decompression System", pp. 1-24.

PTO, "Office Action", U.S. Appl. No. 10/706,584, Mail Date Aug. 24, 2007, 15 pages.

PTO, "Final Office Action", U.S. Appl. No. 10/706,584, Notification Date Feb. 22, 2008, 11 pages.

PTO, "Notice of Allowance and Fee(s) Due", U.S. Appl. No. 10/706,584, Date Mailed Jul. 10, 2008, 8 pages.

PTO, "Office Action", U.S. Appl. No. 10/771,003, Notification Date Jan. 2, 2008, 16 pages.

PTO, "Notice of Allowance and Fee(s) Due", U.S. Appl. No. 10/771,003, Date Mailed Aug. 1, 2008, 53 pages.

PTO, "Notice of Allowance and Fee(s) Due", U.S. Appl. No. 12/268,556, Date Mailed Feb. 17, 2010, 15 pages.

PTO, "Notice of Allowance and Fee(s) Due", U.S. Appl. No. 12/268,556, Date Mailed May 27, 2010, 19 pages.

* cited by examiner

FIG. 1

| Index number | Input * | Output ** |
|---|---|---|
| 00 | 0 0 0 0 | 0 |
| 01 | 0 0 0 1 | 0 |
| 02 | 0 0 1 0 | 1 |
| 03 | 0 0 1 1 | 1 (set to 0 for darker output) |
| 04 | 0 1 0 0 | 1 |
| 05 | 0 1 0 1 | 1 (set to 0 for darker output) |
| 06 | 0 1 1 0 | 1 |
| 07 | 0 1 1 1 | 1 |
| 08 | 1 0 0 0 | 0 |
| 09 | 1 0 0 1 | 0 |
| 10 | 1 0 1 0 | 0 (set to 1 for lighter output) |
| 11 | 1 0 1 1 | 0 |
| 12 | 1 1 0 0 | 0 (set to 1 for lighter output) |
| 13 | 1 1 0 1 | 0 |
| 14 | 1 1 1 0 | 1 |
| 15 | 1 1 1 1 | 1 |

White = 1, Black = 0

FIG. 2

| Index number | Input * | Output ** |
|---|---|---|
| 00 | 0000 | 0 |
| 01 | 0001 | 0 |
| 02 | 0010 | 1 |
| 03 | 0011 | 1 (set to 0 for lighter output) |
| 04 | 0100 | 1 |
| 05 | 0101 | 1 (set to 0 for lighter output) |
| 06 | 0110 | 1 |
| 07 | 0111 | 1 |
| 08 | 1000 | 0 |
| 09 | 1001 | 0 |
| 10 | 1010 | 0 (set to 1 for darker output) |
| 11 | 1011 | 0 |
| 12 | 1100 | 0 (set to 1 for darker output) |
| 13 | 1101 | 0 |
| 14 | 1110 | 1 |
| 15 | 1111 | 1 |

White = 0, Black = 1

BLACK WHITE IMAGE SCALING HAVING PRINT DENSITY CONTROL AND POLARITY DETECTION

CROSS REFERENCE TO RELATED APPLICATION

The present invention is related to co-pending U.S. patent application Ser. No. 10/706,584, filed on Nov. 12, 2003, entitled "System and Method for Providing Black White Image Compression," and U.S. patent application Ser. No. 10/771,033, filed on Feb. 3, 2004, entitled "Black White Image Compression Having Print Density Control," which are hereby incorporated by reference.

BACKGROUND OF THE INVENTION

1. Technical Field

The present invention relates generally to image compression, and more specifically relates to a black white image data scaling system and method having print density control and polarity detection.

2. Related Art

Since the advent of the modem information technology age, systems have been developed to store, process, or communicate black white image data retrieved from printed documents. Common examples include, for instance, facsimile machines, copiers, scanners, etc. In many instances, the system is required to archive, store or transmit the black and white image data. To improve performance, the image data is compressed, thereby reducing storage, processing and bandwidth requirements.

Black white image data compression techniques are well known in the art. Due to the universal need for encoding and decoding (namely compression and decompression) of image data, the industry has adopted standards, which are widely used today. CCITT-G4, for example, is one of the most popular standards, finding its most extensive use in facsimile machines. Typical compression ratios using CCITT-G4 are on the order of 10-15×. Ultimately, the amount of compression is a function of the black white image information/data content.

In the case of most black white compression standards, such as CCITT-G4, the compression process, which is engineered to be an encoding process, is lossless, i.e., following the decompression process, all information present in the original image is fully recovered. Limitations exist with respect to the amount of compression that can be achieved.

Numerous present day industries are increasingly required to archive vast amounts of information in electronic form. Examples include the finance industry saving check images, the insurance industry saving documents, the health care industry saving medical records, the legal industry, federal and state governments, etc. Accordingly, in order to reduce storage costs, data compression for black white images remains of vital interest.

Often, it is not necessary for the compression to be completely lossless, i.e., some minor compression errors may be acceptable so long as the pertinent information contained on the document is not lost. For instance, imperfections on a compressed bank check image may be acceptable as long as legibility of the important information, e.g., name, amount, account, etc., is not impacted by the compression. An image compression system that could also enhance legibility of important information would be of great use for industries seeking black white image compression.

SUMMARY OF THE INVENTION

The present invention addresses the above-mentioned problems by providing a bitonal (e.g., black white) image compression system and method having print density control for enhancing legibility of information on a scaled image, wherein the compression system includes polarity detection.

In a first aspect, the invention provides a scaling system for scaling a bitonal image, comprising: a polarity detection system for detecting a polarity of the bitonal image; a pixel reduction system that generates a scaled image by reducing pixel pairs down to single scaled pixels by selectively applying either a normal or reverse set of pixel reduction rules, wherein an applied set of pixel reduction rules is determined based on a detected polarity; and a line density control system that allows the scaled image to be made lighter or darker by changing the applied set of pixel reduction rules.

In a second aspect, the invention provides a program product stored on a computer readable medium for scaling a bitonal image, comprising: means for detecting a polarity of the bitonal image; means for generating a scaled image by reducing pixel pairs down to single scaled pixels by selectively applying either a normal or reverse set of pixel reduction rules, wherein an applied set of pixel reduction rules is determined based on a detected polarity; and means for changing the applied set of pixel reduction rules to allow the scaled image to be made lighter or darker.

In a third aspect, the invention provides a method for scaling a bitonal image, comprising: selecting a line density setting; determining a polarity of the bitonal image; selecting a set of pixel reduction rules based on the selected line density setting and on the polarity of the bitonal image; and generating a scaled image by reducing pixel pairs down to single scaled pixels based on the selected set of pixel reduction rules.

In a fourth aspect, the invention provides a method for deploying an application that scales bitonal images, comprising: providing a computer infrastructure being operable to: detect a polarity of the bitonal image; generate a scaled image by reducing pixel pairs down to single scaled pixels by selectively applying either a normal or reverse set of pixel reduction rules, wherein an applied set of pixel reduction rules is determined based on a detected polarity; and allow the scaled image to be made lighter or darker by changing the applied set of pixel reduction rules.

In a fifth aspect, the invention provides computer software embodied in a propagated signal for scaling a bitonal image, the computer software comprising instructions to cause a computer to perform the following functions: allow for the selection of a line density setting; determine a polarity of the bitonal image; select a set of pixel reduction rules based on the selected line density setting and on the polarity of the bitonal image; and generate a scaled image by reducing pixel pairs down to single scaled pixels based on the selected set of pixel reduction rules.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

The present invention provides a methodology for compressing images, beyond the capabilities of standardized encoding technologies, such as that provided by CCITT-G4. The compression technique described herein also provides a mechanism for providing print density control of lines or other printed data that appear on the image. Thus, lines or printed data can be made lighter, normal or darker to improve legibility of information.

As described below, the compression technique of the present invention is dependent upon the polarity of the bitonal image (i.e., does 1=white and 0=black? or does 0=white and 1=black?). Accordingly, the invention detects the polarity and then applies the appropriate scaling algorithm. For the purposes of this disclosure, it is assumed that 1=white and 0=black refers to a "normal" polarity and 0=white and 1=black refers to a "reverse" polarity. However, it should be understood that the terms normal and reverse could be applied oppositely.

Moreover, while the embodiments described herein are described with reference to black white images, it should be recognized that the scope of the invention may be applied to any bitonal image. Furthermore, while the invention is described with reference to a CCITT-G4 encoding system, it is understood that any known bitonal encoding technique could be utilized. Examples include ABIC, JBIG, etc.

The present invention recognizes that two attributes of a bitonal (e.g., black white) image are responsible for making the image legible and readable. The first important attribute involves transitions. As a black white image is scanned (similar in manner as a CRT scans a screen), one notices the presence of transitions, both from white to black and black to white. It is this aspect that gives the image contrast, readily noticed by the human eye. When properly placed transitions occur on multiple scan lines, legible and readable information begins to appear.

The second important attribute involves the very small (i.e., single) isolated features, namely, single black pixels between white pixels or single white pixels between black pixels.

These isolated features provide richness and sharpness to an image. As long as the scaling system is able to preserve these two attributes, and substantially maintain their relative geographic locations, a transformed image will offer near identical informational content.

Typical black white images (such as checks and other printed documents) have approximately 10% of their pixel space represented by black pixels. Since many of these black pixels will invariably be clustered together, a few transition points (relative to the entire pixel space) will be encountered when the image is scanned. Similarly, a typical black white image will also contain occasional isolated features. For example, there may be areas contained in the image where a single black pixel is sandwiched between white pixels, or where a single white pixel is sandwiched between black pixels.

A feature of the invention is to geometrically scale the image to reduce the pixel count while maintaining the two aforementioned attributes. In the illustrative embodiments described below, the pixel count is reduced by 2× in both the X and Y direction. However, it should be understood that any pixel reduction that maintains the two attributes could be utilized. Accordingly, the scaling techniques described herein cover any bitonal pixel reduction in which transition and isolated attributes are preserved, and the attributes' relative geographic positions are substantially maintained.

Figure 1:
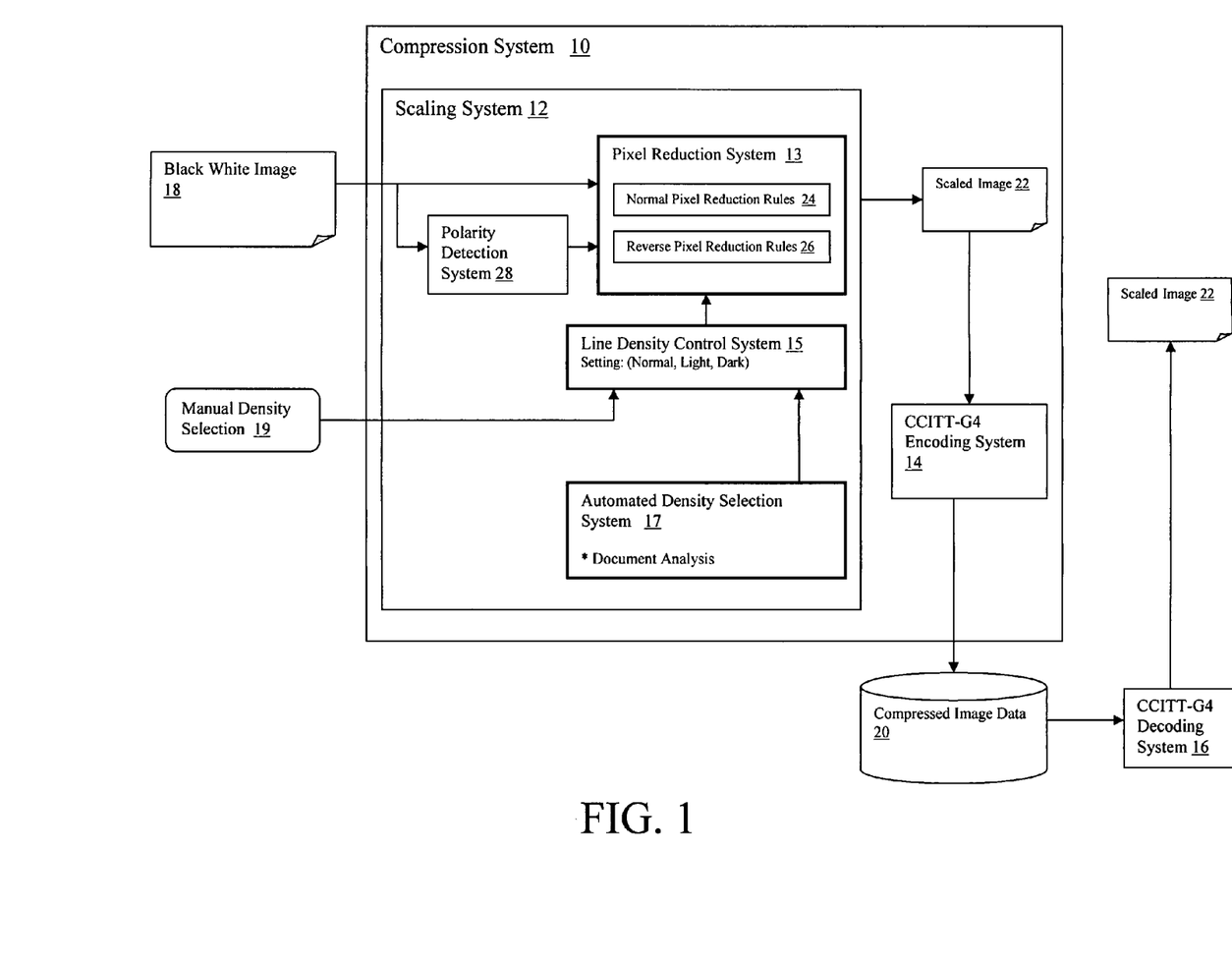
FIG. 1 depicts a bitonal compression system in accordance with the present invention.

Referring now to FIG. 1, a compression system 10 is shown that includes a scaling system 12 and a CCITT-G4 encoding system 14. Although shown together, it should be understood that scaling system 12 could be implemented independently from an encoding system. In addition, it should be understood that CCITT-G4 encoding system 14 is just one example of an encoding system that could be utilized in conjunction with the scaling system 12.

In operation, compression system 10 receives a black white image 18 and outputs compressed image data 20, which can be, e.g., archived, transmitted, processed, etc. The black white image 18 is first submitted to a scaling system 12, which includes a polarity detection system 28, a pixel reduction system 13, a line density control system 15 and an automated density selection system 17.

Once the image is submitted to scaling system 12, polarity detection system 28 examines the black white image 18 to determine its polarity, i.e., does 1=white and 0=black, or does 0=white and 1=black. Any now known or later developed method may be used to detect the polarity of the image. For instance, in a TIFF image, polarity detection system 28 could examine the photometric information contained in the image header to determine whether the image is a normal image (1=white and 0=black) or a reverse image (0=white and 1=black). Polarity detection system 28 could be implemented to receive and analyze different image formats, e.g., TIFF, IOCA, etc., and determine the polarity of each.

Once the polarity of the black white image 18 is determined, the image 18 and polarity information is inputted to pixel reduction system 13. Pixel reduction system 13 scales the image, resulting in a pixel reduction in which transition and isolated attributes are preserved and the attributes' relative geographic positions are substantially maintained. Depending on the polarity of the black white image, pixel reduction system 13 will either apply a set of normal pixel reduction rules 24 or a set of reverse pixel reduction rules 26. The application of these rules is described in further detail below.

Also included in scaling system 12 is a line density control system 15, which provides a mechanism for interfacing with the reduction rules 24, 26 to select a light, normal or dark setting for the scaled image 22. Input to the line density control system 15 may be provided with a manual density selection 19 (e.g., as selected by a user) or an automated density selection system 17. Automated density selection system 17 automatically determines whether the image should be made lighter, normal or darker, e.g., based on an analysis of the document. The output of scaling system 12 is a scaled image 22, which is reduced in size from the original black white image 18, and which may have been made lighter or darker to improve legibility.

Pixel scaling system 13 generates a scaled image 22 by reducing pixel pairs down to single scaled pixels. As noted above, pixel reduction is based on the selected set of pixel reduction rules 24, 26. As will be described in more detail below with reference to FIGS. 2 and 3, the pixel reduction rules 24, 26 may be implemented as pixel reduction tables 40, 42 that allow for a simple look-up procedure for scaling sets of contiguous pixels. Although this illustrative embodiment is implemented using tables 40, 42, the pixel reduction rules 24, 26 could be implemented in any fashion, e.g., programmatically as a "case" statement or a series of "if-then" statements in a software procedure, hardwired into an ASIC device, etc.

Line density control system 15 generally provides three density selection settings: light, normal or dark. Thus, if the printed features or data on the black white image 18 are too light, they can be made darker in the scaled image 22; if the printed features or data on the black white image 18 are acceptable, then the scaled image 22 can be generated with no density change; or if the printed features or data on the black white image 18 are too dark, they can be made lighter in the scaled image 22. As will be described below, line density control system 13 implements density settings by making minor changes to the applied set of pixel reduction scaling rules 24, 26, e.g., as embodied in the pixel reduction tables 40, 42, shown in FIGS. 2 and 3.

As noted above, line density control system 15 can operate either as an automated process or as a manual process. For the manual process, the user could make a manual density selection 19 of light, normal or dark, based on their preference. For automated processing, an automated density selection system 17 may be provided that automatically determines whether the image should be made lighter, normal or darker. The process of making an automated decision regarding line density can be done using any methodology. For instance, document features such as stroke width (pen thickness) or font size could be measured. Alternatively, either the local or global print density of the image could be measured. In any case, if the measured value fell below a first preset threshold indicating narrow lines, then automated density selection system 17 could set line density control system 15 to the dark setting. Alternatively, if the measured value was above a second preset threshold indicating broad lines, then automated density selection system 17 could set line density control system 15 to the light setting. Finally, if the measured value was between the first and second preset threshold indicating medium lines, then automated density selection system 17 could set line density control system 15 to the normal setting.

Moreover, the image could be fragmented by an image processing system, e.g., into text and graphics portions, such that different regions of the image could be made lighter, normal or darker based on local measurements. Accordingly, for the purposes of this disclosure, the term "image," may refer to a region of an image.

Although not required, other filtering and processing operations could also be applied to further improve the quality of the scaled image 22. The scaled image 22 is then submitted to a CCITT-G4 encoding system 14, which performs an industry standard encoding operation (commonly used in facsimile operations and the like). Note that other industry standard encoding system could likewise be used.

Once encoded, the scaled image 22 can be retrieved by decoding the compressed image data 20 with an industry standard CCITT-G4 decoding system 16. The scaled black white image 22 can then be manipulated as needed (e.g., displaying, printing, zooming, and expanding) using known techniques and systems with aliasing corrections.

Using the compression system 10 described above, a size reduction of about 45% can be achieved over the compression achieved by a stand-alone CCITT-G4 encoding system 14 working on an unscaled image. Note that the scaled image 22 may have limited, localized, geometric distortion. For instance, a single pixel may sometimes be displaced by one pixel position. However, this distortion is only evident when viewed under high magnification. Accordingly, for most all applications (such as E13B OCR readability), any distortion will not diminish or affect the information content being presented in the image.

Figure 2:
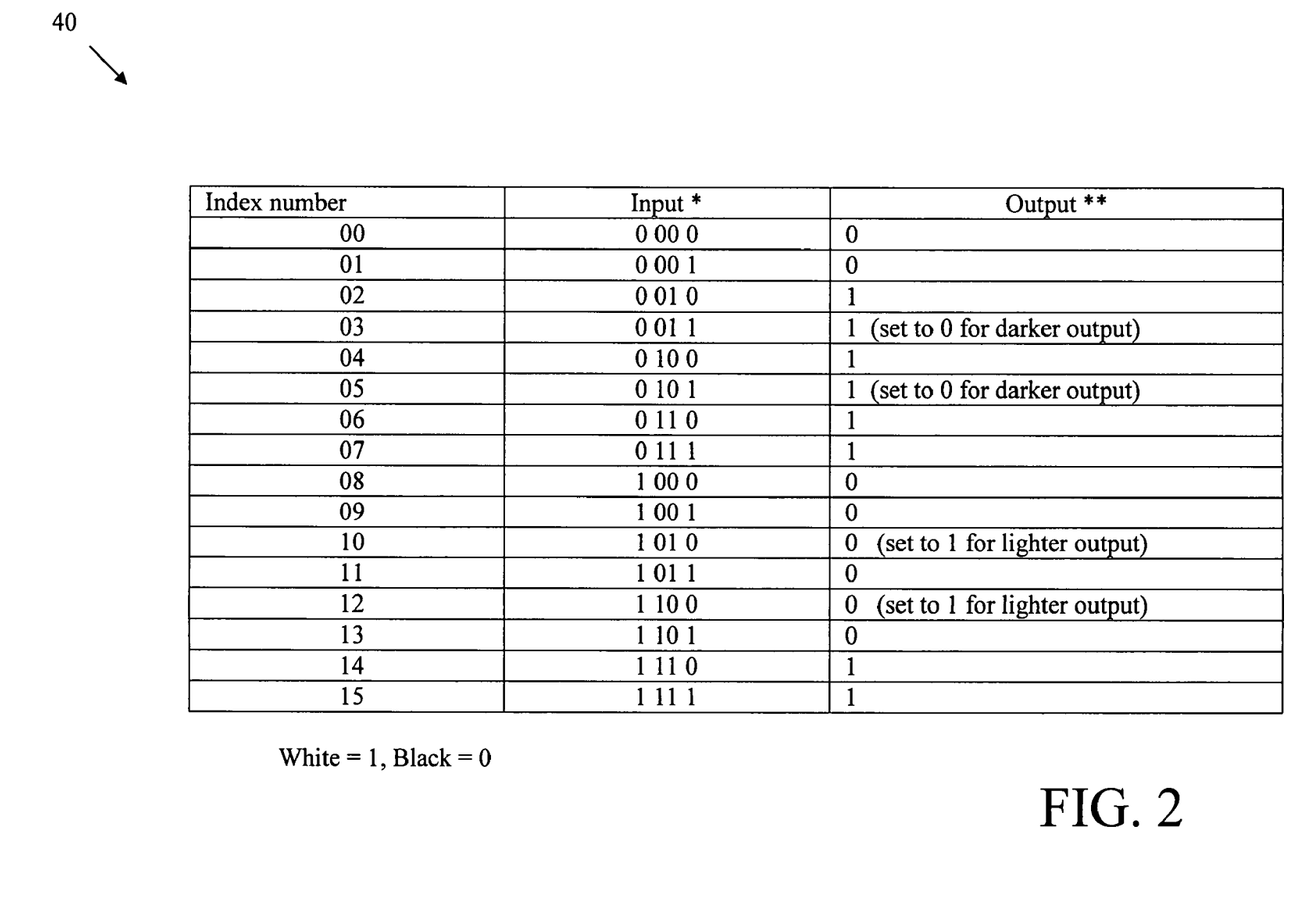
FIG. 2 depicts a normal pixel reduction table in accordance with the present invention.
Figure 3:
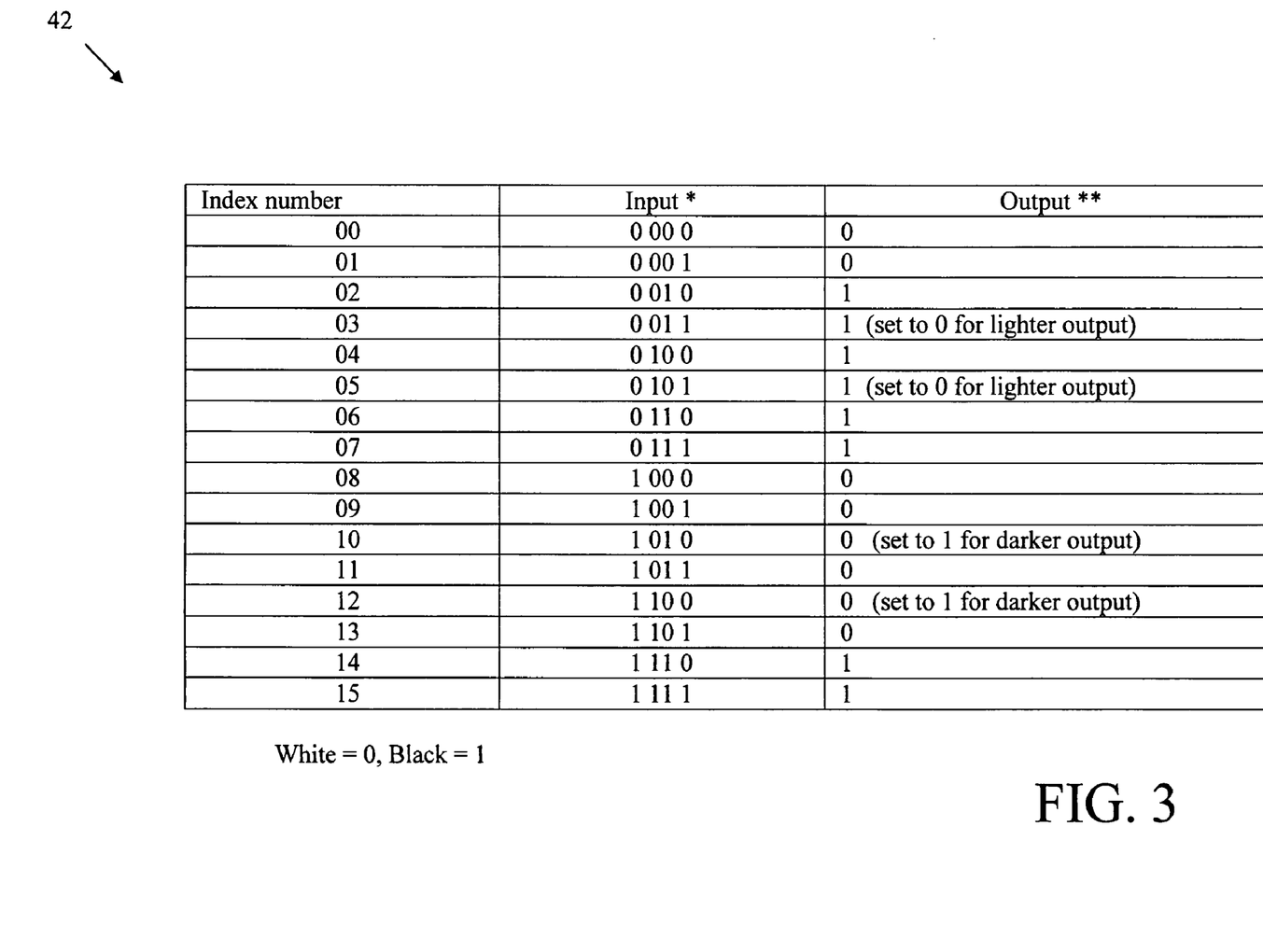
FIG. 3 depicts a reverse pixel reduction table in accordance with the present invention.

As noted above, depending upon the polarity detected by polarity detection system 28, either a set of normal pixel reduction rules 24 or a set of reverse pixel reduction rules 26 will be applied to the black white image. FIGS. 2 and 3 depict tables 40, 42 for implementing both a set of normal reduction rules 24 and a set of reverse reduction rules 26, respectively.

In these illustrative embodiments, a 2× scaling reduction is achieved using pixel reduction rules embodied each table. Specifically, each table provides a simple look-up tool for reducing two contiguous original pixel pairs down to a single scaled pixel. In order to achieve this, the tables dictate whether to assign the scaled pixel a value of 1 or 0 (for table 40 in FIG. 2, 1=white, 0=black; for table 42 in FIG. 3, 0=white, 1=black). In both cases, reduction is achieved by examining the two original pixels (i.e., pixel pair) and the two flanking pixels that neighbor the two original pixels.

For instance, in the tables 40, 42 shown in FIGS. 2 and 3, all possible combinations of four pixel values are shown in the input column and the index number is their decimal representation. It is the two central pixels of the input column that are replaced by the output. Output values are determined based on the four digit binary input value such that transition and isolated attributes are preserved in the scaled image, and the attributes' relative geographic positions are substantially maintained. For instance, it can be seen that "0 01 0" has an isolated feature (i.e., a 1 sandwiched between zeros). Accordingly, this results in an output value of 1. The input "1 10 0" has a transition from 1's to 0's. Accordingly, the output value is 0 to ensure that the transition is maintained. Each possible four-digit binary input value ranging from 0000-1111 therefore results in a unique one digit binary output, i.e., 0 or 1.

Note that the output values shown in both tables 40, 42 are the default values for a normal line density setting. In order to effectuate a lighter or darker setting, the one-digit binary output values can be manipulated as shown in the parenthesis of the output column. For instance, in the table 40 shown in FIG. 2, if a darker output is desired, then the output values for 0011 and 0101 are changed from 1 to 0. Alternatively, if a lighter output is desired, then the output values for 1010 and 1100 are changed from 0 to 1.

In the table 42 shown in FIG. 3, if a lighter output is desired, then the output values for 0011 and 0101 are changed from 1 to 0. Alternatively, if a darker output is desired, then the output values for 1010 and 1100 are changed from 0 to 1.

Manipulating these values can be readily accomplished (e.g., with a software routine, using separate tables, etc.) as needed by line density control system 15 to change the line density settings.

The tables 40, 42 depicted in FIGS. 2 and 3 provide a 2× image reduction. Obviously, various alternative embodiments (e.g., examining a six digit binary input number, providing a 3× image reduction, etc.) could be implemented to achieve similar results. In a typical embodiment, the image may be first scaled in one direction, e.g., horizontally, and then be scaled in the other direction, e.g., vertically.

Figure 4:
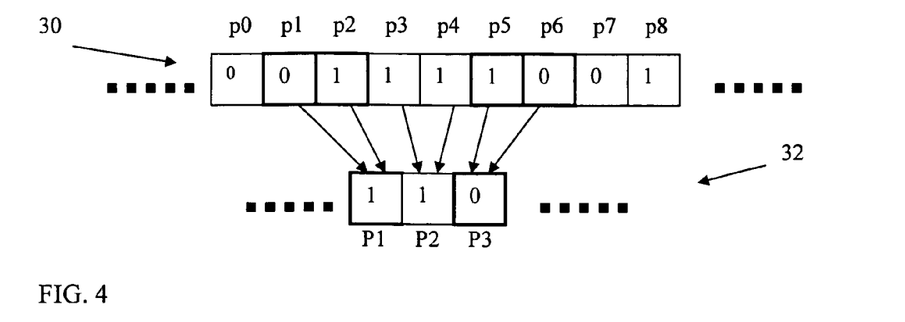
FIG. 4 depicts an exemplary scaling operation using normal pixel reduction in which a normal line density setting is utilized in accordance with the present invention.
Figure 5:
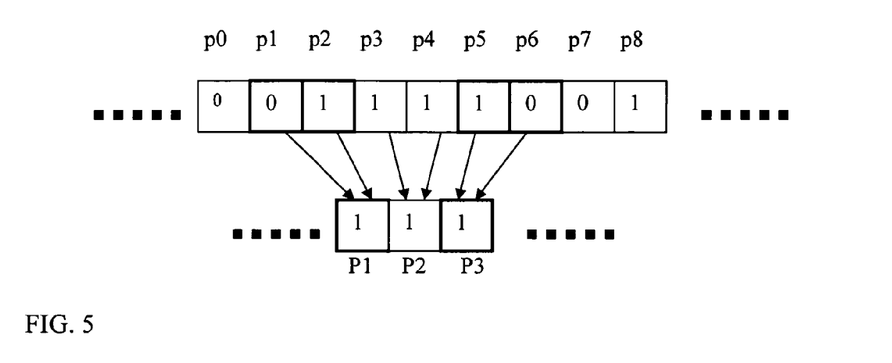
FIG. 5 depicts an exemplary scaling operation using normal pixel reduction in which a light line density setting is utilized in accordance with the present invention.
Figure 6:
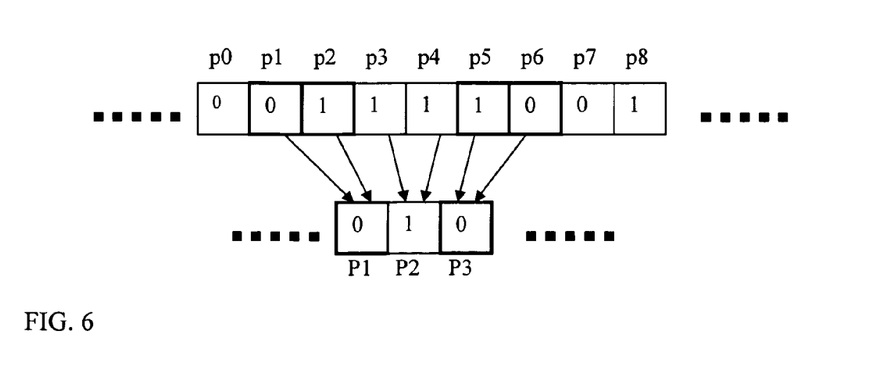
FIG. 6 depicts an exemplary scaling operation using normal pixel reduction in which a dark line density setting is utilized in accordance with the present invention.

FIGS. 4-6 depict illustrative scaling results in which the number of pixels is reduced by a factor of two using the pixel reduction rules provided by table 40. FIG. 4 depicts results for a normal line density setting, FIG. 5 depicts results for a lighter line density setting, and FIG. 6 depicts results for a darker line density setting.

As depicted in FIG. 4, a first partial row 30 of pixels p0, p1 . . . p8 is shown prior to scaling, and a second partial row 32 of pixels P1, P2, P3, is shown after scaling. Each pixel of the black white (or any bitonal) image 18 has a value of either 1 or 0, where 1 represents white and 0 represents black. In this example, pixels p1-p6 are scaled down to P1-P3, i.e., contiguous sets of pixel pairs p1-p2, p3-p4, and p5-p6 are scaled to P1, P2, and P3, respectively.

Accordingly, when scaling pixels p1 and p2, the applicable pixel reduction rules examine pixel values for p0, p1, p2 and p3, in this case 0010. The four values provide the input into the table shown in FIG. 2. In this case, the input 0011 refers to index number 03, and yields an output value of 1. Accordingly, the scaled value for the original pixel pair p1, p2 is 1.

Similarly, the scaled value P2 for the original pixel pair p3, p4 is determined by examining the four values of pixels p2-p5 (i.e., 1111). In this case, the input 1111 refers to index number 15, and yields an output value of 1. The scaled value P3 for the original pixel pair p5, p6 is determined by examining the four values of pixels p4-p7 (i.e., 1100). In this case, the input 1100 refers to index number 12, and also yields an output value of 0.

FIG. 5 shows the results for applying the normal pixel reduction rules 24 to the same pixel set p0-p8 with a lighter line density setting. In this case, the first pixel reduction p1, p2→P1 does not change from that described above, since the input value 0011 is not affected by a change to the line density setting. Similarly, the second pixel reduction p3, p4→P2 does not change since the input value 1111 is not affected by a change to the line density setting. However, the third pixel reduction p5, p6→P3 is affected, since the result for input 1100 gets changed from a 0 to 1, relative to the normal setting, when the lighter setting is selected (see FIG. 2).

FIG. 6 shows the results for applying the normal pixel reduction rules 24 to the same pixel set p0-p8 with a darker line density setting. In this case, the first pixel reduction p1, p2→P1 is affected, since the result for input 0011 gets changed from a 1 to 0, relative to the normal setting, when the darker setting is selected (see FIG. 2). The remaining pixel reductions p3, p4→P2 and p5, p6→P3 are not affected by the darker selection.

Accordingly, it can be seen that effectuating a change from normal to lighter or darker is a relatively simple process that can be readily integrated into the pixel reduction rules 24, 26.

Figure 7:
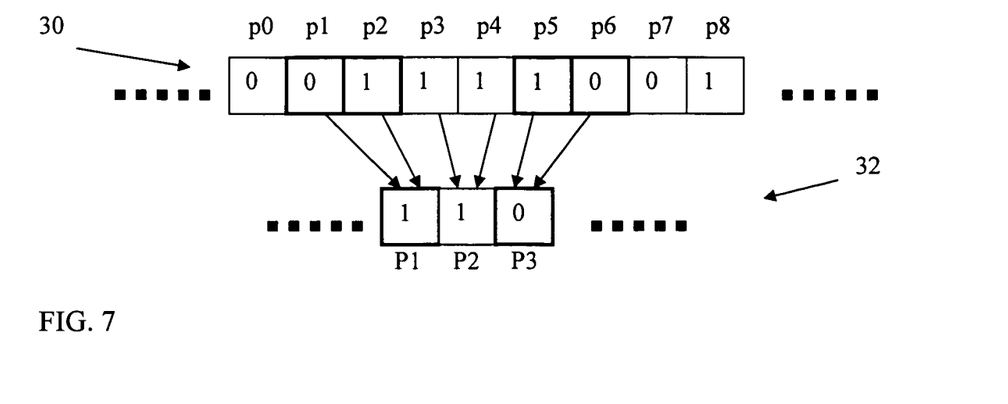
FIG. 7 depicts an exemplary scaling operation using reverse pixel reduction in which a normal line density setting is utilized in accordance with the present invention.
Figure 8:
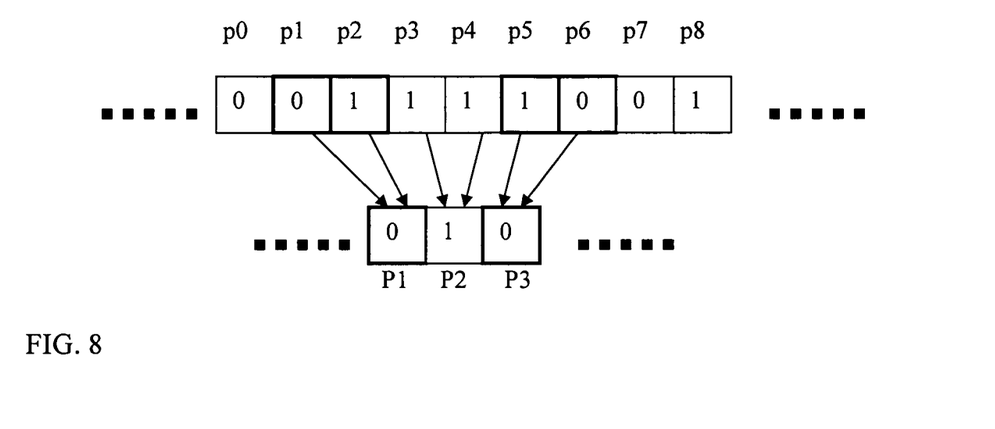
FIG. 8 depicts an exemplary scaling operation using reverse pixel reduction in which a light line density setting is utilized in accordance with the present invention.
Figure 9:
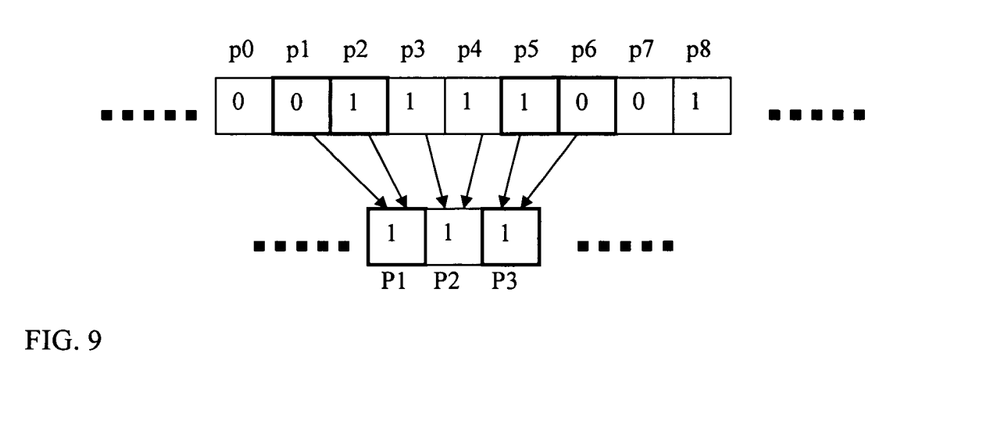
FIG. 9 depicts an exemplary scaling operation using reverse pixel reduction in which a dark line density setting is utilized in accordance with the present invention.

FIGS. 7-9 depict illustrative pixel reduction results similar to that described above in FIGS. 4-6, except that the reverse pixel reduction rules 26 (White=0, Black=1) are applied using table 42 shown in FIG. 3. FIG. 7 depicts results for a normal line density setting, FIG. 8 depicts results for a lighter line density setting, and FIG. 9 depicts results for a darker line density setting.

Since FIG. 7 reflects a normal line density setting, the results are the same as that shown in FIG. 4. In FIG. 8, in which a lighter line density setting is enabled, scaled pixel P1 is set to 0 since the input values are 0111. In FIG. 9, in which a darker line density setting is enabled, the scaled pixel value P3 is set to 1 since the values are 1100.

It should be appreciated that the teachings of the present invention could be offered as a business method on a subscription or fee basis. For example, a computer system comprising a scaling system 12 could be created, maintained and/or deployed by a service provider that offers the functions described herein for customers. That is, a service provider could offer to perform pixel reduction in which transition and isolated attributes are preserved, and the attributes' approximate relative geographic positions are substantially maintained, as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A scaling system for scaling a bitonal image, comprising:
   at least one computer hardware device;
   a polarity detection system for detecting a polarity of the bitonal image;
   a pixel reduction system that generates a scaled image by reducing a plurality of two pixel sets to a plurality of single pixels by selectively applying either a normal or reverse set of pixel reduction rules, wherein an applied set of pixel reduction rules is determined based on a detected polarity, wherein the applied set of pixel reduction rules map an input comprised of four pixel values to an output comprised of one pixel value, wherein the four pixel values include two values of a two pixel set being reduced to a single pixel and two values of two pixels that flank the two pixel set being reduced to a single pixel; and
   a line density control system that allows the scaled image to be made lighter or darker by changing the applied set of pixel reduction rules.

2. The scaling system of claim 1, wherein the applied set of pixel reduction rules are incorporated into a look-up table.

3. The scaling system of claim 1, wherein the applied set of pixel reduction rules provide for sixteen possible values for the input ranging from binary 0000 to 1111, and two possible values for the output comprising 0 and 1.

4. The scaling system of claim 3, wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 1, 1, respectively for a normal line density setting.

5. The scaling system of claim 4, wherein the line density control system sets the outputs associated with inputs 0011 and 0101 to 0 to achieve a darker image for a normal polarity image, and sets the outputs associated with inputs 1100 and 1010 to 1 to achieve a darker image for a reverse polarity image.

6. The scaling system of claim 4, wherein the line density control system sets the outputs associated with inputs 1010 and 1100 to 1 to achieve a lighter image for a normal polarity image, and sets the outputs associated with inputs 0101 and 0011 to 0 to achieve a lighter image for a reverse polarity image.

7. The scaling system of claim 1, wherein the bitonal image comprises a black white image.

8. The scaling system of claim 1, wherein the polarity detection system examines photometric information in the bitonal image to detect polarity.

9. The scaling system of claim 1, further comprising an automated density selection system that automatically determines whether the scaled image should be made lighter or darker.

10. The scaling system of claim 9, wherein the automated density selection system analyzes data selected from the group consisting of: stroke width, font size, and print density.

11. A computer readable medium storing a program product for scaling a bitonal image, comprising computer readable program code for performing the steps of:
detecting a polarity of the bitonal image;
generating a scaled image by reducing a plurality of two pixel sets to a plurality of single pixels by selectively applying either a normal or reverse set of pixel reduction rules, wherein an applied set of pixel reduction rules is determined based on a detected polarity, wherein the applied set of pixel reduction rules map an input comprised of four pixel values to an output comprised of one pixel value, wherein the four pixel values include two values of a two pixel set being reduced to a single pixel and two values of two pixels that flank the two pixel set being reduced to a single pixel;
changing the applied set of pixel reduction rules to allow the scaled image to be made lighter or darker; and
retrieving the scaled image on a device for displaying or printing the scaled image.

12. The computer readable medium of claim 11, wherein the applied set of pixel reduction rules are incorporated into a look-up table.

13. The computer readable medium of claim 11, wherein the applied set of pixel reduction rules for a normal line density setting provide for sixteen possible values for the input ranging from binary 0000 to 1111, and two possible values for the output of 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 1, 1, respectively.

14. The computer readable medium of claim 13, wherein said changing the applied set of pixel reduction rules sets the outputs associated with inputs 0011 and 0101 to 0 to achieve a darker image for a normal polarity image, and sets the outputs associated with inputs 1100 and 1010 to 1 to achieve a darker image for a reverse polarity image.

15. The computer readable medium of claim 13, wherein said changing the applied set of pixel reduction rules sets the outputs associated with inputs 1010 and 1100 to 1 to achieve a lighter image for a normal polarity image, and sets the outputs associated with inputs 0101 and 0011 to 0 to achieve a lighter image for a reverse polarity image.

16. The computer readable medium of claim 11, wherein the detecting polarity examines photometric information in a header of the bitonal image.

17. The computer readable medium of claim 11, further comprising automatically determining whether the scaled image should be made lighter or darker.

18. The computer readable medium of claim 17, wherein the determining analyzes data selected from the group consisting of: stroke width, font size and print density.

19. A method for scaling a bitonal image, comprising:
selecting a line density setting;
determining a polarity of the bitonal image;
selecting a set of pixel reduction rules based on the selected line density setting and on the polarity of the bitonal image, wherein the set of pixel reduction rules map an input comprised of four pixel values to an output comprised of one pixel value, wherein the four pixel values include two values of a two pixel set being reduced to a single pixel and two values of two pixels that flank the two pixel set being reduced to a single pixel;
generating a scaled image by reducing a plurality of two pixel sets to a plurality of single pixels based on the selected set of pixel reduction rules; and
retrieving the scaled image on a device for displaying or printing the scaled image.

20. The method of claim 19, wherein the step of selecting a line density setting is done automatically by analyzing data on the bitonal image, wherein the data is selected from the group consisting of: stroke width, font size, and print density.

21. The method of claim 19, wherein the line density setting is selected from the group consisting of: light, normal and dark.

22. The method of claim 19, wherein the set of pixel reduction rules for a normal line density setting provide for sixteen possible values for the input ranging from binary 0000 to 1111, and two possible values for the output of 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 1, 1, respectively.

23. The method of claim 22, wherein the set of pixel reduction rules sets the outputs associated with inputs 0011 and 0101 to 0 to achieve a darker image for a normal polarity image, and sets the outputs associated with inputs 1100 and 1010 to 1 to achieve a darker image for a reverse polarity image.

24. The method of claim 22, wherein the set of pixel reduction rules sets the outputs associated with inputs 1010 and 1100 to 1 to achieve a lighter image for a normal polarity image, and sets the outputs associated with inputs 0101 and 0011 to 0 to achieve a lighter image for a reverse polarity image.

25. The method of claim 19, wherein the step of determining the polarity include examining photometric information in a header of the bitonal image.

26. The method of claim 19, comprising the further step of encoding the scaled image with a CCITT-G4 encoder.

27. A method for deploying an application that scales bitonal images, comprising:

providing at least one computer hardware device for performing the steps of:

detect a polarity of the bitonal image;

generate a scaled image by reducing a plurality of two pixel sets to a plurality of single pixels by selectively applying either a normal or reverse set of pixel reduction rules, wherein an applied set of pixel reduction rules is determined based on a detected polarity, wherein the applied set of pixel reduction rules map an input comprised of four pixel values to an output comprised of one pixel value, wherein the four pixel values include two values of a two pixel set being reduced to a single pixel and two values of two pixels that flank the two pixel set being reduced to a single pixel;

allow the scaled image to be made lighter or darker by changing the applied set of pixel reduction rules; and retrieve the scaled image on a device for displaying or printing the scaled image.

* * * * *